United States Patent
Vaughan et al.

(10) Patent No.: US 9,382,020 B1
(45) Date of Patent: Jul. 5, 2016

(54) DEEP SPACE POSITIONING SYSTEM

(71) Applicant: The United States of America as Represented by the Administrator of NASA, Washington, DC (US)

(72) Inventors: Andrew T. Vaughan, Superior, CO (US); Joseph E. Riedel, Littlerock, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 147 days.

(21) Appl. No.: 14/470,438

(22) Filed: Aug. 27, 2014

(51) Int. Cl.
| | |
|---|---|
| *B64G 1/66* | (2006.01) |
| *B64G 3/00* | (2006.01) |
| *B64G 1/10* | (2006.01) |
| *B64G 1/52* | (2006.01) |

(52) U.S. Cl.
CPC .. *B64G 1/66* (2013.01); *B64G 1/10* (2013.01); *B64G 1/52* (2013.01); *B64G 3/00* (2013.01)

(58) Field of Classification Search
CPC .............. B64G 1/10; B64G 1/52; B64G 3/00; B64G 1/66
See application file for complete search history.

(56) References Cited

U.S. PATENT DOCUMENTS

| | | | |
|---|---|---|---|
| 3,290,933 A | 12/1966 | Lillestrand et al. | |
| 3,301,508 A | 1/1967 | Yamron | |
| 3,370,460 A | 2/1968 | Haake et al. | |
| 3,636,330 A | 1/1972 | Holeman et al. | |
| 5,745,869 A | 4/1998 | van Bezooijen | |
| 5,754,147 A | 5/1998 | Tsao et al. | |
| 6,072,571 A * | 6/2000 | Houlberg | F41G 3/165 250/203.1 |
| 6,622,970 B2 | 9/2003 | Guo | |
| 6,734,911 B1 * | 5/2004 | Lyons | G01S 3/781 348/169 |
| 7,197,381 B2 | 3/2007 | Sheikh et al. | |
| 7,240,879 B1 | 7/2007 | Cepollina et al. | |
| 7,293,743 B2 | 11/2007 | Cepollina et al. | |
| 7,438,264 B2 | 10/2008 | Cepollina et al. | |
| 7,451,059 B2 | 11/2008 | Malchi et al. | |
| 7,487,016 B2 | 2/2009 | Fowell et al. | |
| 7,513,459 B2 | 4/2009 | Cepollina et al. | |
| 7,513,460 B2 | 4/2009 | Cepollina et al. | |
| 7,706,917 B1 | 4/2010 | Chiappetta et al. | |
| 7,856,294 B2 | 12/2010 | Van Gaasbeck et al. | |
| 8,045,418 B2 | 10/2011 | Suzuki | |
| 8,540,382 B1 | 9/2013 | Hultberg | |
| 8,594,840 B1 | 11/2013 | Chiappetta et al. | |
| 8,634,956 B1 | 1/2014 | Chiappetta et al. | |
| 8,634,958 B1 | 1/2014 | Chiappetta et al. | |

(Continued)

OTHER PUBLICATIONS

"Navigation camera", accessible at http://stardust.jpl.nasa.gov/mission/camera.html published on Nov. 26, 2003.

(Continued)

*Primary Examiner* — Justin Benedik
(74) *Attorney, Agent, or Firm* — Mark Homer

(57) ABSTRACT

A single, compact, lower power deep space positioning system (DPS) configured to determine a location of a spacecraft anywhere in the solar system, and provide state information relative to Earth, Sun, or any remote object. For example, the DPS includes a first camera and, possibly, a second camera configured to capture a plurality of navigation images to determine a state of a spacecraft in a solar system. The second camera is located behind, or adjacent to, a secondary reflector of a first camera in a body of a telescope.

12 Claims, 5 Drawing Sheets

(56) References Cited

U.S. PATENT DOCUMENTS

| | | |
|---|---|---|
| 2003/0006345 A1 | 1/2003 | Guo |
| 2004/0245407 A1 | 12/2004 | D'Ausilio et al. |
| 2005/0192719 A1 | 9/2005 | Sheikh et al. |
| 2007/0010965 A1 | 1/2007 | Malchi et al. |
| 2007/0125910 A1 | 6/2007 | Cepollina et al. |
| 2007/0138344 A1 | 6/2007 | Cepollina et al. |
| 2007/0164164 A1 | 7/2007 | Cepollina et al. |
| 2007/0233321 A1 | 10/2007 | Suzuki |
| 2008/0011904 A1 | 1/2008 | Cepollina et al. |
| 2009/0157236 A1 | 6/2009 | Van Gaasbeck et al. |
| 2012/0249775 A1 | 10/2012 | Paluszek et al. |
| 2012/0292482 A1 | 11/2012 | Cook et al. |
| 2013/0006449 A1 | 1/2013 | Hindman |
| 2013/0229709 A1* | 9/2013 | Newswander ......... G02B 23/02 359/399 |
| 2014/0043704 A1 | 2/2014 | Hultberg |

OTHER PUBLICATIONS

David Szondy, "Future spacecraft could use dead stars to navigate", accessible at http://www.gizmag.com/pulsar-naviagtion/24498, published on Oct. 10, 2012.

S. Synnott et al., "Small Optical Navigation Camera for Interplanetary Missions" accessible at http://hdl.handle.net/2014/37190, published at 2002 Core Technologies for Space Systems, Colorado Springs, CO, USA, on Nov. 19, 2002.

Shyam Bhaskaran, "Autonomous Navigation for Deep Space Missions", accessible at http://www.spaceops2012.org/proceedings/documents/id1267135-Paper-001.pdf, published at SpaceOps 2012 Conference Proceedings, Stockholm, Sweden, on Jun. 11-15, 2012.

* cited by examiner

DEEP SPACE POSITIONING SYSTEM

ORIGIN OF THE INVENTION

Embodiments of the present invention described herein were made in the performance of work under NASA contract NNN12AA01C and are subject to the provisions of Public Law #96-517 (35 U.S.C. §202) in which the Contractor has elected not to retain title.

FIELD

The present invention generally pertains to deep-space automated navigation system(s) and, more particularly, to a deep space positioning system including self-pointing navigation camera(s).

BACKGROUND

There is no extant automatic positioning system, analogous to the Global Positioning System (GPS), for use in the solar system beyond Low Earth orbit. Constructing this system would require a large amount of monetary investment. The ability to have a single device (analogous to a GPS receiver) that could be in interplanetary space, and provide a position and velocity of a spacecraft, is a highly attractive and desirable ability.

Another issue that arises in space missions is the integration of onboard software and hardware systems. The test and validation of the integrated systems is extremely laborious, costly, risk-prone, and time-consuming Thus, a relatively inexpensive, non-laborious positioning device with software and hardware integration for deep space would be beneficial.

SUMMARY

Certain embodiments of the present invention may be implemented and provide solutions to the problems and needs in the art that are outside the capabilities of conventional deep space navigation, and provide the analogous utility of GPS but in deep space (e.g., beyond Low Earth Orbit (LEO)). For instance, some embodiments pertain to a single, compact, low-power device that can, without the aid of additional infrastructure, determine its own position and velocity anywhere in the Solar System. The device may also provide location information relative to the Earth, Sun, or a remote target body. In a further embodiment, an onboard software system may be pre-integrated with the device allowing for reduction in cost, and, alternatively, include navigation software hosted separately from the device in another locale on the spacecraft.

In one embodiment of the present invention, an apparatus includes a first camera configured to capture a plurality of navigation images to determine a position of at least one object in a solar system. The apparatus also includes a processing unit configured to determine the position of the at least one object in the solar system.

In another embodiment, an apparatus includes a first camera configured to capture at least one navigation image, and a second camera configured to capture at least one other navigation image, to determine a position of at least one object in a solar system. The second camera is located behind a secondary reflector of the first camera, or has an optical path through a mirror on the secondary reflector, in a body of a telescope, or mounted adjacent to the first camera.

In yet another embodiment, an apparatus includes at least one camera configured to capture a plurality of navigation images to determine a state of the apparatus, spacecraft, or object in a solar system. The state includes a position, velocity, attitude, and attitude rate.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention pertain to a DPS that includes a self-contained instrument (hereinafter DPS instrument) analogous to a GPS locating device via an automated optical navigation process. The DPS instrument may operate throughout the Solar System and, more importantly, provide target relative navigation, i.e., the analogous equivalent to a GPS providing a person's position relative to moving targets on the Earth such as vehicles or clouds.

In some embodiments, the DPS may not have a self-pointing mirror, and instead use the pointing position of the host spacecraft to reorient the camera(s) field of view.

In a further embodiment, the DPS may include radio metric navigation through the use of a radio-receiving antenna, either separately placed, or more particularly placed on the back of the self-pointing mirror. In this case, the hardware suite includes a software-defined radio that can perform radio-metric measurement extraction (e.g. Doppler and range measurements) from an Earth station radio beacon, or other source such as another spacecraft. Also, in this embodiment, the software suite is updated to include the ability to use the radio-metric measurements for a navigation solution.

Figure 1A:
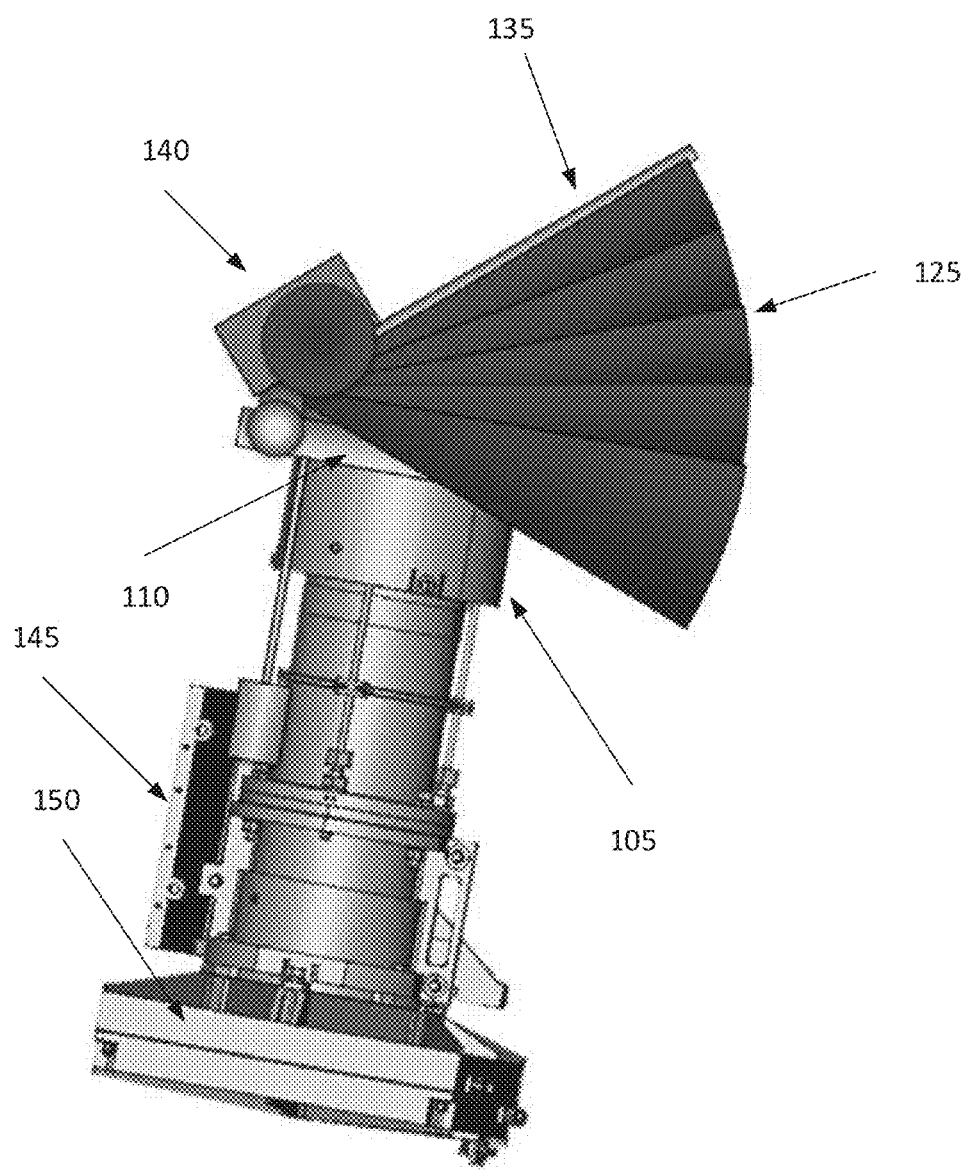
FIGS. 1A and 1B illustrate a deep space positioning system (DPS), according to an embodiment of the present invention.
Figure 1B:
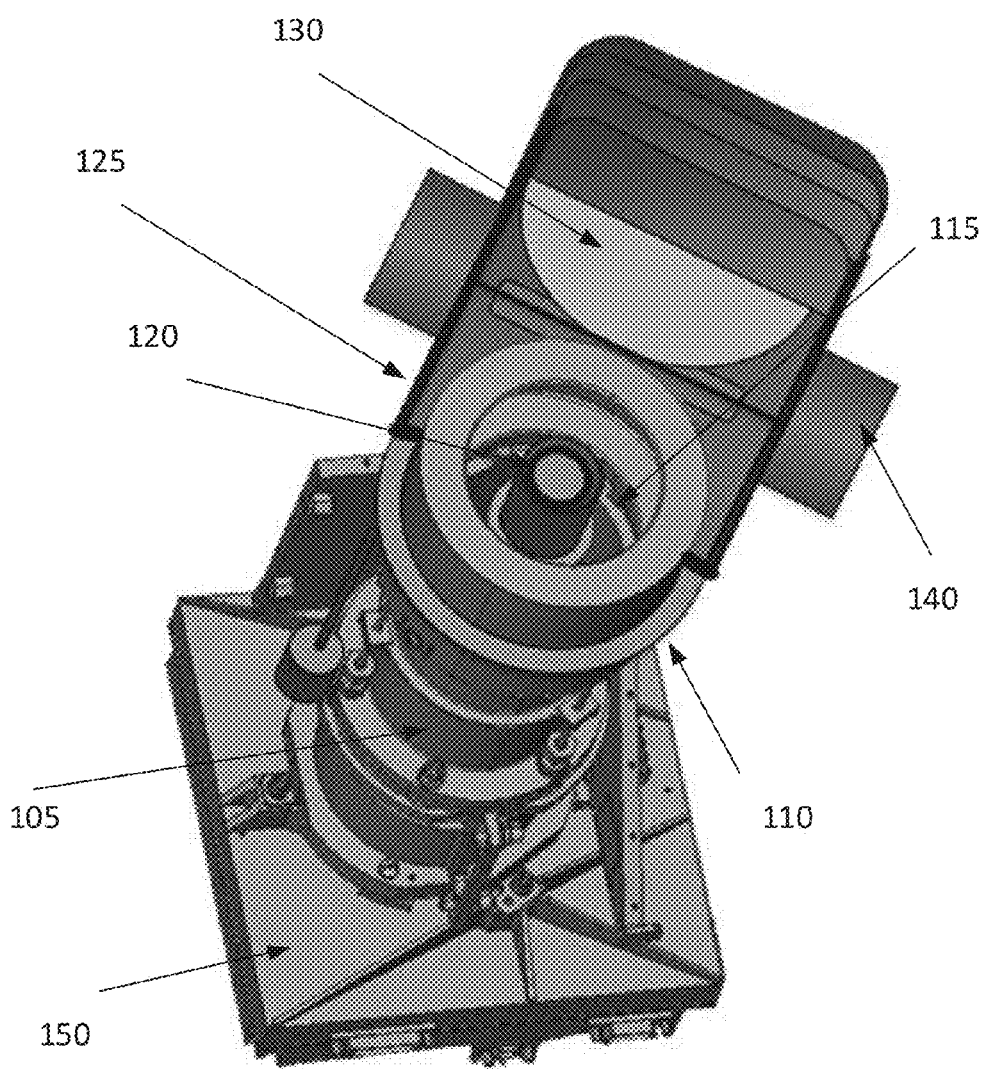

FIGS. 1A and 1B illustrate a DPS instrument 100, according to an embodiment of the present invention. DPS instrument 100 includes a telescope body 105 connected to a computing system 150. Computing system 150 may include high-capability, lower power and mass processor, hosting an automated navigation software module, attitude estimation module, and optionally visual determined attitude rates. A more detailed description of computing system 150 is discussed below with respect to FIG. 2.

Telescope body 105 also includes a narrow angle camera (NAC) 115 and a wide angle camera (WAC) 120. See, for example, FIG. 1B. In this embodiment, WAC 120 is positioned behind a secondary reflector of NAC 115 to assure co-boresighting of NAC 115 and WAC 120. This configuration further allows WAC 120 to share the precise field of NAC 115, and provide for accurate pointing information for NAC 115 when stars are not available in the navigation field of view (FOV) at the exposures necessary to image a near-field object in NAC 115. In another embodiment, WAC 120 is mounted adjacent to NAC 115 using a distinct optical path.

In some embodiments, NAC 115 provides high-resolution imagery of navigation targets. WAC 120 provides context imagery, as well as navigation imagery when DPS instrument 100 is too close to, or near, the target for NAC 115 to be useful. WAC 120 and NAC 115 may simultaneous capture images at different exposure settings.

In this embodiment, mirror 130 is a steerable mirror, and may be a coelostat in some embodiments. The steerable mirror 130 may provide operational flexibility by decoupling the need to reorient the spacecraft to obtain navigation images, which for some mission scenarios could be impossible. Such decoupling can save mission costs dramatically by reducing operational constrains on the spacecraft.

It should be noted that most missions require the spacecraft to reorient to obtain navigation images or radio-metrics. Most missions also require the cessation of science activities during navigation data acquisition due to the possible differences between desired science and navigation targeting. To overcome these issues, mirror 130 may rotate around telescope body 105 via a guide 110. This allows images of multiple targets to be captured without reorienting the spacecraft.

DPS instrument 100 also includes a foldable cover (or sunshade) 125 configured to hold mirror 130. Foldable cover 125 may also provide protection to mirror 130, and protection to NAC 115 and WAC 120. Because foldable cover 125 surrounds majority of the mirror, glare from the sun may be blocked allowing for a higher quality image to be captured during navigation image acquisition. Attached to the rear of mirror 130 is an antenna 135, which may receive a radio beacon from another object, such as another spacecraft or ground station.

Antenna 135 may be used in some embodiments to receive a navigation beacon from another object, such as another spacecraft or a ground station such as the Deep Space Network (DSN), from which DPS instrument 100 will extract radiometric information. This allows an embodiment of this invention to combine optical and radiometric measurements into a more accurate navigation solution. Since antenna 135 is attached to steerable mirror 130, it may be pointed at the radio source without changing the orientation of the spacecraft. Antenna 135, together with mirror 130, may act as a protective cover to protect NAC 115 and WAC 120, when antenna 135 and mirror 130 are in a closed state.

DPS instrument 100 also includes a plurality of accelerometers 140. Accelerometers 140 may be three-axis accelerometers 140 configured to allow the navigation software to detect external forces on the spacecraft. External forces may include vehicle maneuvers or impact with the target in a rendezvous or touch-and-go scenario. The detected external forces allow the navigation filter (not shown) to provide a better spacecraft position and velocity solution. By affixing accelerometers 140 to the mirror 130, very high performance is possible from accelerometers 140 through improved means of calibration. Accelerometers 140 may be calibrated by modifying or changing the orientation of accelerometers 140 relative to an acceleration. In addition, accelerometers 140 may be used to determine rotation rate of the spacecraft through differential measurements. In addition, images of stars may be used to determine rates of rotation.

In one embodiment, readings, such as external forces, from accelerometers 140 are made at different angles on mirror 130, and are calibrated at a high precision. For example, calibration may be performed by slewing mirror 130 to provide an acceleration against which to calibrate. In another example, calibration may be performed when the host spacecraft turns. By using well-calibrated accelerometers 140, the attitude rate of the DPS and host spacecraft may be determined by differential reading of accelerometers 140 (or gyroscopy). A person of ordinary skill in the art would readily appreciate that gyroscopy refers to the measurement of rates of rotation of an object.

Radiator 145 may maintain DPS instrument's 100 imaging sensor and electronics at a suitable operating temperature.

Figure 2:
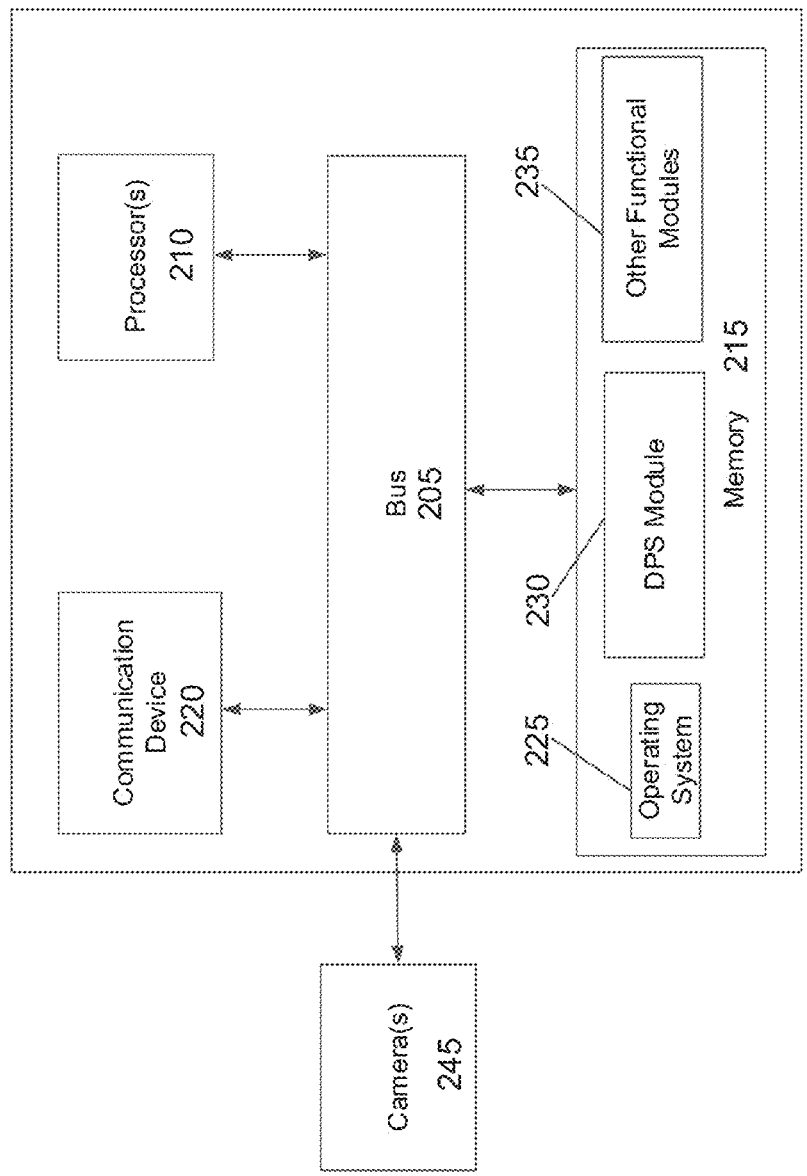
FIG. 2 is a block diagram illustrating a computing system for DPS, according to an embodiment of the present invention.

FIG. 2 is a block diagram illustrating a computing system for DPS, according to an embodiment of the present invention. Computing system 200 includes a bus 205 or other communication mechanism for communicating information, and processor(s) 210 coupled to bus 205 for processing information. Processor(s) 210 may be any type of general or specific purpose processor, including a central processing unit ("CPU") or application specific integrated circuit ("ASIC"), but are generally adapted for or shielded for the operation in the deep space environment. Processor(s) 210 may also have multiple processing cores, and at least some of the cores may be configured to perform specific functions. Computing system 200 further includes memory 215 for storing information and instructions to be executed by processor(s) 210. Memory 215 can be comprised of any combination of random access memory ("RAM"), read only memory ("ROM"), flash memory, cache, static storage such as a magnetic or optical disk, or any other types of non-transitory computer-readable media or combinations thereof. Additionally, computing system 200 may include a communication device 220, such as a transceiver and antenna, to wirelessly provide access to a communications network onboard the spacecraft.

Non-transitory computer-readable media may be any available media that can be accessed by processor(s) 210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 215 stores software modules that provide functionality when executed by processor(s) 210. The modules include an operating system 225 for computing system 200. The modules further include a DPS module 230 that is configured to determine location of the spacecraft relative to Earth, Sun, or any Solar System object. Computing system 200 may include one or more additional functional modules 235 that include additional functionality.

DPS module 230 may provide other services for the host spacecraft beyond providing position and velocity of the spacecraft. These other services may include providing trajectory correction directives (i.e., maneuver designs), attitude change directives (i.e., turn designs), attitude estimation, attitude rate estimation, as well as relative target estimation (i.e., estimation of positions and velocities of objects other than the host spacecraft).

Camera(s) 245 may be configured to capture navigation image data in order for DPS module 230 to calculate and provide state. State may include position of DPS instrument, one or more spacecraft, or any other object as would be appreciated by a person of ordinary skill in the art. State may also include position, velocity, attitude, and/or attitude of DPS instrument, spacecraft(s), or any other object. Spacecraft may include the spacecraft hosting the DPS instrument, as well as any other spacecraft. Objects may include asteroids, planets, moons, comets, etc. State may further include estimable parameters such as accelerometer bias, camera focal length, target phase bias, camera calibration parameters, etc.

It should be appreciated that in some embodiments, the navigation image data from camera(s) 245 may be used to track stars, and determine the DPS (and by inference the host spacecraft) attitude and attitude rate. Attitude rate may be determined by combining the navigation image data captured over time in a navigation filter without the use a mechanical unit, such as microelectromechanical sensors or laser gyros.

One skilled in the art will appreciate that a "system" could be embodied as an embedded system, a single board computer (SBC), or any other suitable computing device, or combination of devices, capable of providing processing functionality, in the deep space environment, for the spacecraft. Presenting the above-described functions as being performed by a "system" is not intended to limit the scope of the present invention in any way, but is intended to provide one example of many embodiments of the present invention.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
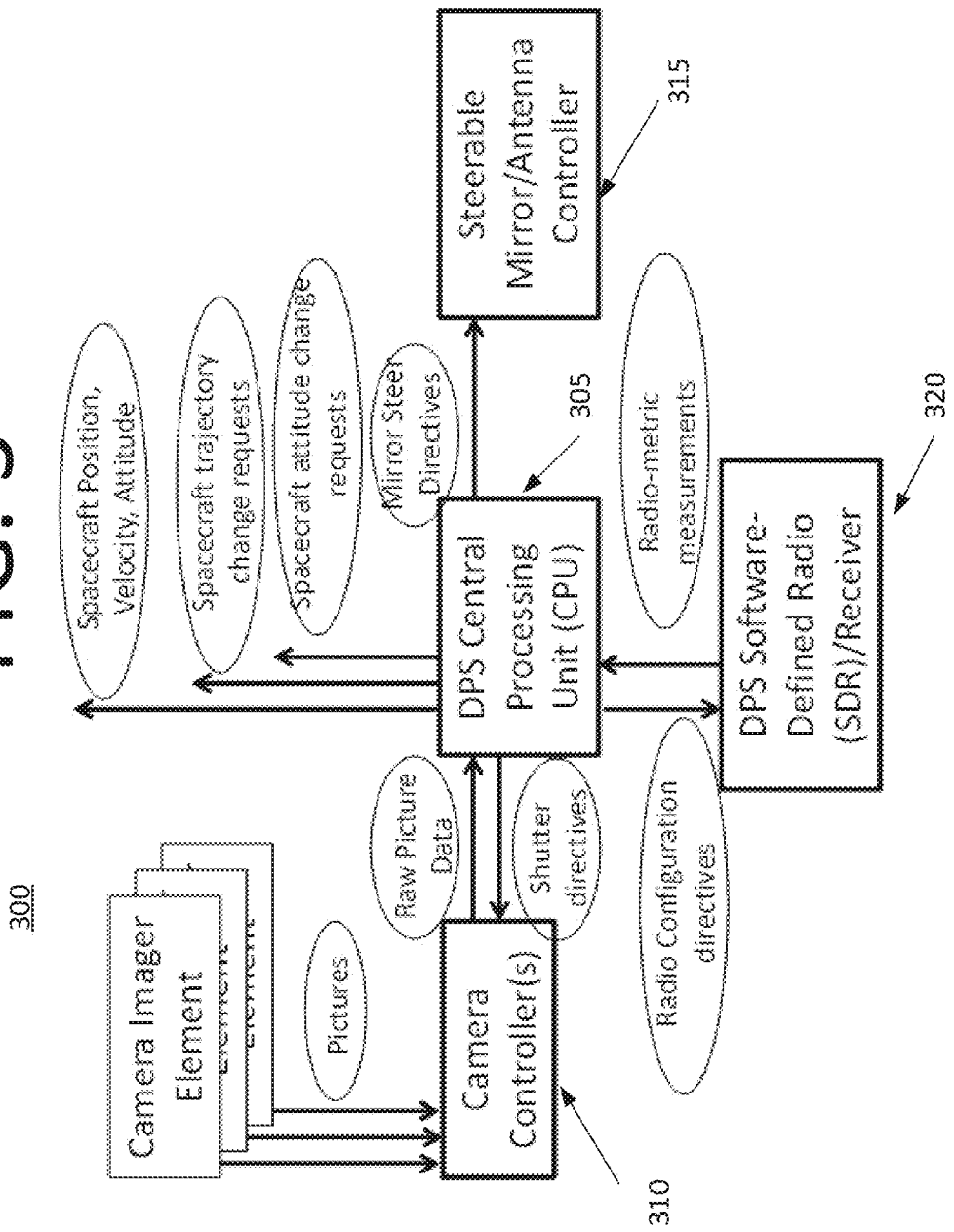
FIG. 3 is a block diagram illustrating a DPS computing system, according to an embodiment of the present invention.

FIG. 3 is a block diagram illustrating a DPS computing system 300, according to an embodiment of the present invention. DPS computing system 300 includes at least one DPS central processing unit (CPU) 305, at least one camera controller 310, a steerable mirror and antenna controller 315, and a DPS software defined radio (SDR) and receiver 320.

DPS computing system 300 may also host the navigation, guidance and control software, and may be executed by CPU 305. Camera controller(s) 310 may provide power, control, and data electrical interface to cameras. Steerable mirror and antenna controller 315 may provide electrical stimulation to the mirror actuators (not shown). DPS SDR and receiver 320 may operate function as a receiver and a radio-metric data extraction processor. The SDR 320 and the CPU 305 may in some embodiments be the same processing device.

Figure 4:
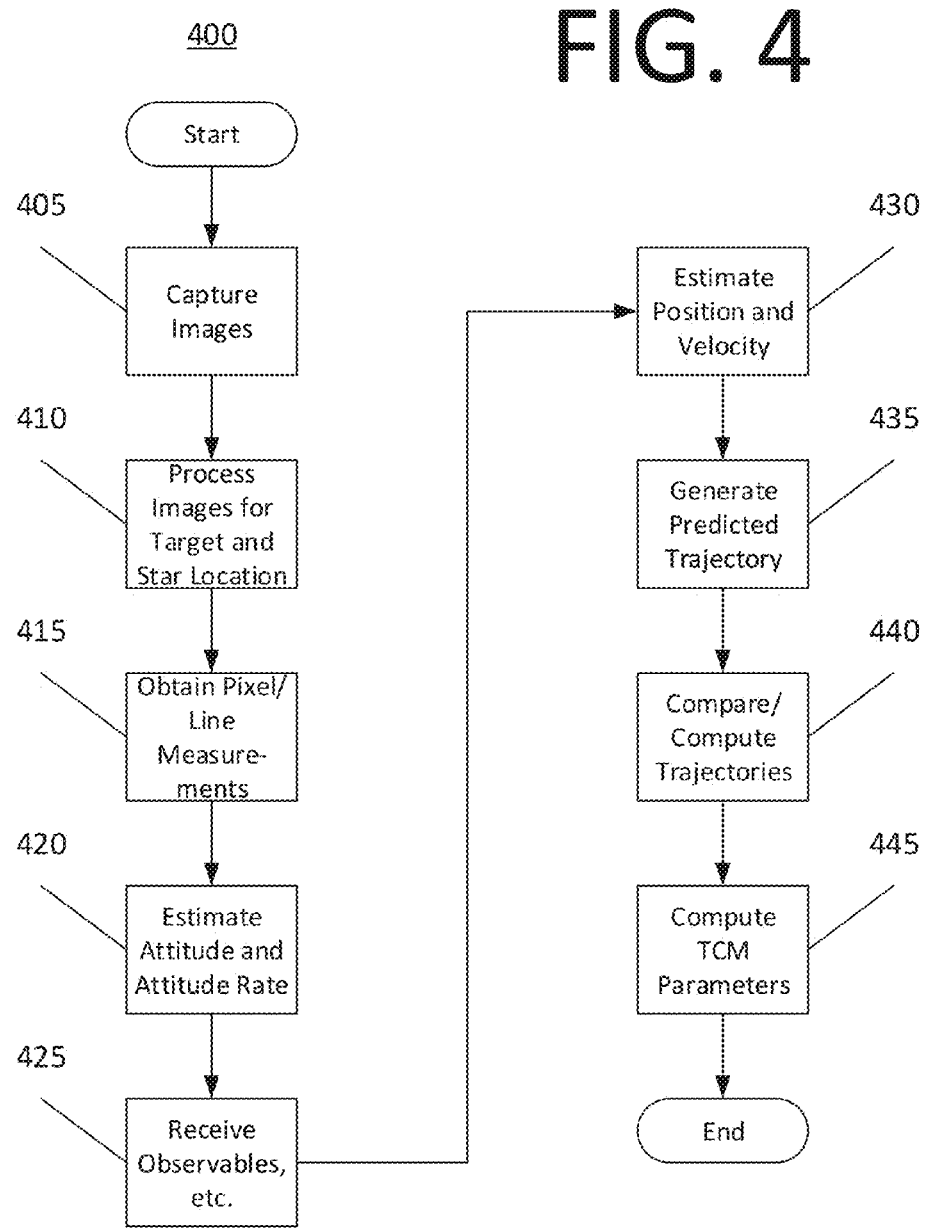
FIG. 4 is a flow diagram illustrating a process for determining a location, velocity, attitude, and/or trajectory of at least one object, according to an embodiment of the present invention.

FIG. 4 is a flow diagram 400 illustrating a process for determining a location, velocity, attitude, and/or trajectory of at least one object, according to an embodiment of the present invention. The at least one object may include the DPS instrument, spacecraft, or any object in the Solar System. In some embodiments, the process of FIG. 4 may be executed by computing system 200 of FIG. 2 or computing system 300 of FIG. 3, for example. It should be appreciated that the operation of the navigation function of the DPS instrument is cyclic, and, thus, the process may begin at any step.

For purposes of simplicity, the process may begin at 405 with the WAC capturing one or more images, and/or the NAC capturing one or more images. The images may be captured at a specific attitude determined by pointing the mirror. At 410, a processor(s) may process the images captured by the WAC and/or the NAC for targets and star locations, respectively. For example, image processing software may determine the actual positions of the objects and stars in the picture.

At 415, processor(s) may obtain pixel and line measurements from the target locations. For example, a target ephemeris database may be used to predict targets in the images captured by the WAC. A star catalog may be used to predict the positions of objects and stars in the images captured by the NAC and/or WAC. The differences between the prediction and actual positions from step 410 may become data in the navigation filter. Simultaneously or sequentially, the star locations may be used to estimate an attitude and attitude rate of the object at 420. The attitude and attitude rate may be transmitted to the host spacecraft in some embodiments.

At 425, a navigation filter may receive radiometric observables from a receiver/SDR, the pixel and line measurements, and/or the attitude and attitude rate. At 430, processor(s) may estimate a position and velocity of the object using the radiometric observables, pixel and line measurements, and/or the attitude and attitude rate. The position and velocity of the object may be relative to the target. Furthermore, the position and velocity may be transmitted to the host spacecraft in some embodiments.

At 435, processor(s) may also generate a predicted trajectory of the object, i.e., past and future trajectory of the object path, using the estimated position and velocity of the object. This predicted trajectory is also passed to the host spacecraft in some embodiments. At 440, a maneuver estimation module may receive the predicted trajectory, and compare it with a reference trajectory to compute the differences between the predicted trajectory and reference trajectory. Reference trajectory may be the pre-determined desired course of the object whose path is to be controlled.

Using the computed differences, trajectory correction maneuver (TCM) parameters are computed at 445, and, in some embodiments, are passed to the host spacecraft for trajectory correction. Using the updated and corrected trajectory, the process may be repeated to compute future imaging requests, along with mirror activation directives.

The process shown in FIG. 4 may be performed, in part, by a computer program, encoding instructions for a nonlinear adaptive processor to cause at least the process described in FIG. 4 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIG. 4, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

In summary, the DPS can be applied to any spacecraft requiring deep space navigation services. This system may have relevance to a wide array of missions from micro missions to NEOs to human missions to Mars. The cameras in DPS may also be applicable in commercial space endeavors. For example, the DPS may be ideal for asteroid reconnaissance and mineral prospecting.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a first camera configured to capture at least one navigation image, and a second camera configured to capture at least one other navigation image, to determine a state of at least one object in a solar system,
wherein the second camera is located behind a secondary reflector of the first camera, or has an optical path through a mirror on the secondary reflector, in a body of a telescope, or mounted adjacent to the first camera.

2. The apparatus of claim 1, wherein
the second camera is mounted adjacent to the first camera using a distinct optical path.

3. The apparatus of claim 1, further comprising:
a mirror configured to rotate around a body of a telescope when the plurality of navigation images are being captured.

4. The apparatus of claim 3, wherein the mirror is configured to protect the first camera and a second camera when the mirror is in a closed state.

5. The apparatus of claim 3, further comprising:
an antenna attached to rear of the mirror.

6. The apparatus of claim 3, further comprising:
a sun shade configured to surround a majority of the mirror to protect the mirror, and prevent a glare during the capture of the navigation image.

7. An apparatus of claim 1, wherein the at least one object comprises the apparatus, a spacecraft, a natural object, or a combination thereof.

8. An apparatus of claim 1, wherein the first camera comprises a narrow angle camera, and the second camera comprises a wide angle camera.

9. An apparatus of claim 1, wherein the at least one navigation image captured by the first camera is used to locate at least one star.

10. An apparatus of claim 1, wherein the at least one other navigation image by the second camera is used to locate at least one target.

11. The apparatus of claim 1, further comprising:
a plurality of accelerometers affixed to a mirror, and configured to detect external forces at different angle on the mirror to determine the attitude rate of the spacecraft.

12. The apparatus of claim 11, wherein the plurality of accelerometers are configured to be calibrated when the spacecraft turns or when the mirror is slewed.

\* \* \* \* \*